(12) United States Patent
Satterfield

(10) Patent No.: US 8,997,660 B2
(45) Date of Patent: Apr. 7, 2015

(54) DEPLOYABLE TABLE ASSEMBLY

(71) Applicant: Johnny A. Satterfield, Northridge, CA (US)

(72) Inventor: Johnny A. Satterfield, Northridge, CA (US)

( * ) Notice: Subject to any disclaimer, the term of this patent is extended or adjusted under 35 U.S.C. 154(b) by 0 days.

(21) Appl. No.: 13/842,641

(22) Filed: Mar. 15, 2013

(65) Prior Publication Data

US 2013/0284074 A1     Oct. 31, 2013

Related U.S. Application Data

(60) Provisional application No. 61/615,131, filed on Mar. 23, 2012.

(51) Int. Cl.
| | | |
|---|---|---|
| *A47B 1/04* | (2006.01) | |
| *A47B 13/08* | (2006.01) | |
| *B60N 3/00* | (2006.01) | |
| *A47B 1/10* | (2006.01) | |
| *B64D 11/06* | (2006.01) | |
| *A47B 5/00* | (2006.01) | |
| *A47B 31/06* | (2006.01) | |

(52) U.S. Cl.
CPC .............. *B60N 3/001* (2013.01); *A47B 13/081* (2013.01); *B64D 2011/0679* (2013.01); *A47B 5/00* (2013.01); *A47B 31/06* (2013.01); *B64D 11/06* (2013.01); *A47B 1/10* (2013.01)

(58) Field of Classification Search
USPC ............. 108/73, 71, 42, 76, 78, 70, 143, 102, 108/72; 297/145, 146
See application file for complete search history.

(56) References Cited

U.S. PATENT DOCUMENTS

| | | | | |
|---|---|---|---|---|
| 3,880,094 | A * | 4/1975 | Kopp et al. ...................... | 108/74 |
| 3,899,982 | A * | 8/1975 | Fetzek ............................ | 108/25 |
| 4,159,071 | A | 6/1979 | Roca | |
| 4,174,669 | A * | 11/1979 | Lalonde ......................... | 108/44 |
| 4,345,758 | A * | 8/1982 | Kempf ........................... | 108/63 |
| 4,944,552 | A * | 7/1990 | Harris ........................... | 297/145 |
| 5,140,914 | A * | 8/1992 | Bohbot et al. ................. | 108/44 |
| 5,370,060 | A * | 12/1994 | Wang ............................. | 108/44 |
| 5,540,158 | A * | 7/1996 | Ford ............................. | 108/115 |
| 5,709,155 | A * | 1/1998 | Terracciano ................... | 108/42 |
| 6,161,486 | A * | 12/2000 | Boots ............................ | 108/48 |
| 6,454,349 | B1 * | 9/2002 | Konya ........................... | 297/146 |
| 6,488,248 | B1 * | 12/2002 | Watt et al. .................... | 108/138 |
| 6,761,398 | B2 * | 7/2004 | Bentley et al. ................. | 297/146 |

(Continued)

FOREIGN PATENT DOCUMENTS

KR     20-1998-0035029     9/1998
KR        20-0189971       8/2000

OTHER PUBLICATIONS

PCT/US2013/033562 International Search Report dated Jul. 22, 2013.

(Continued)

*Primary Examiner* — Jose V Chen

(74) *Attorney, Agent, or Firm* — Venable LLP; Stefan J. Kirchanski

(57) ABSTRACT

A table assembly is provided. The table assembly includes a lower table portion, and an upper table portion operationally engaging the lower table portion. The upper and lower table portions are slidably movable relative to each other between a generally parallel configuration wherein the lower and upper table portions are vertically stacked and a generally co-planar configuration wherein the lower and upper table portions are generally horizontally aligned.

17 Claims, 8 Drawing Sheets

(56) References Cited

U.S. PATENT DOCUMENTS

| | | | |
|---|---|---|---|
| 7,281,762 B1 * | 10/2007 | Getfield | 297/173 |
| D575,546 S * | 8/2008 | Tsay et al. | D6/406.3 |
| 7,506,923 B1 | 3/2009 | Gauss | |
| 7,675,742 B2 * | 3/2010 | Wu et al. | 361/679.08 |
| 7,806,305 B1 * | 10/2010 | Moore et al. | 224/265 |
| 7,942,374 B2 * | 5/2011 | Timm et al. | 248/284.1 |
| 7,963,231 B2 * | 6/2011 | Osborne et al. | 108/40 |
| 8,365,678 B2 * | 2/2013 | Morbidelli | 108/85 |

OTHER PUBLICATIONS

PCT/US2013/033562 Written Opinion dated Jul. 22, 2013.

* cited by examiner

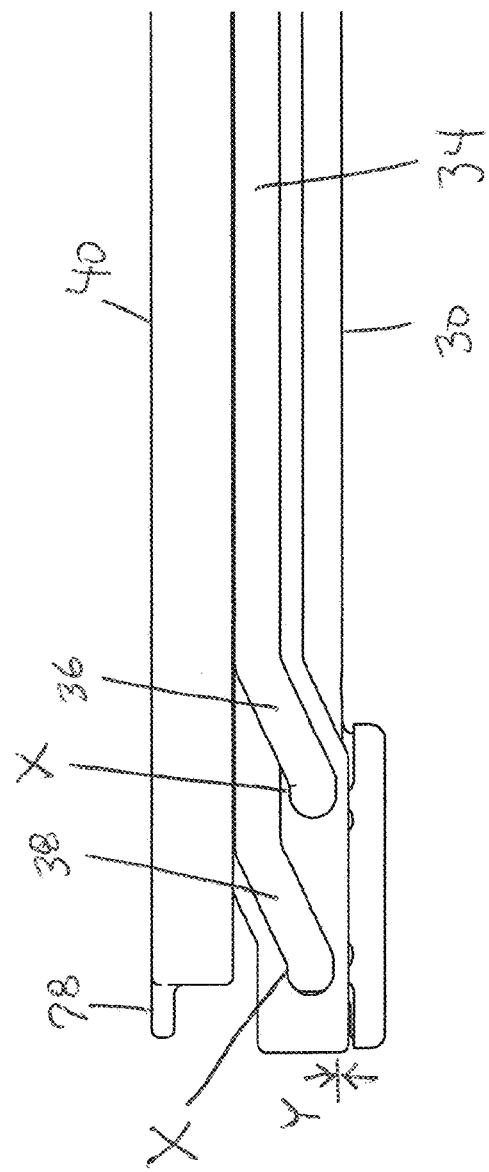

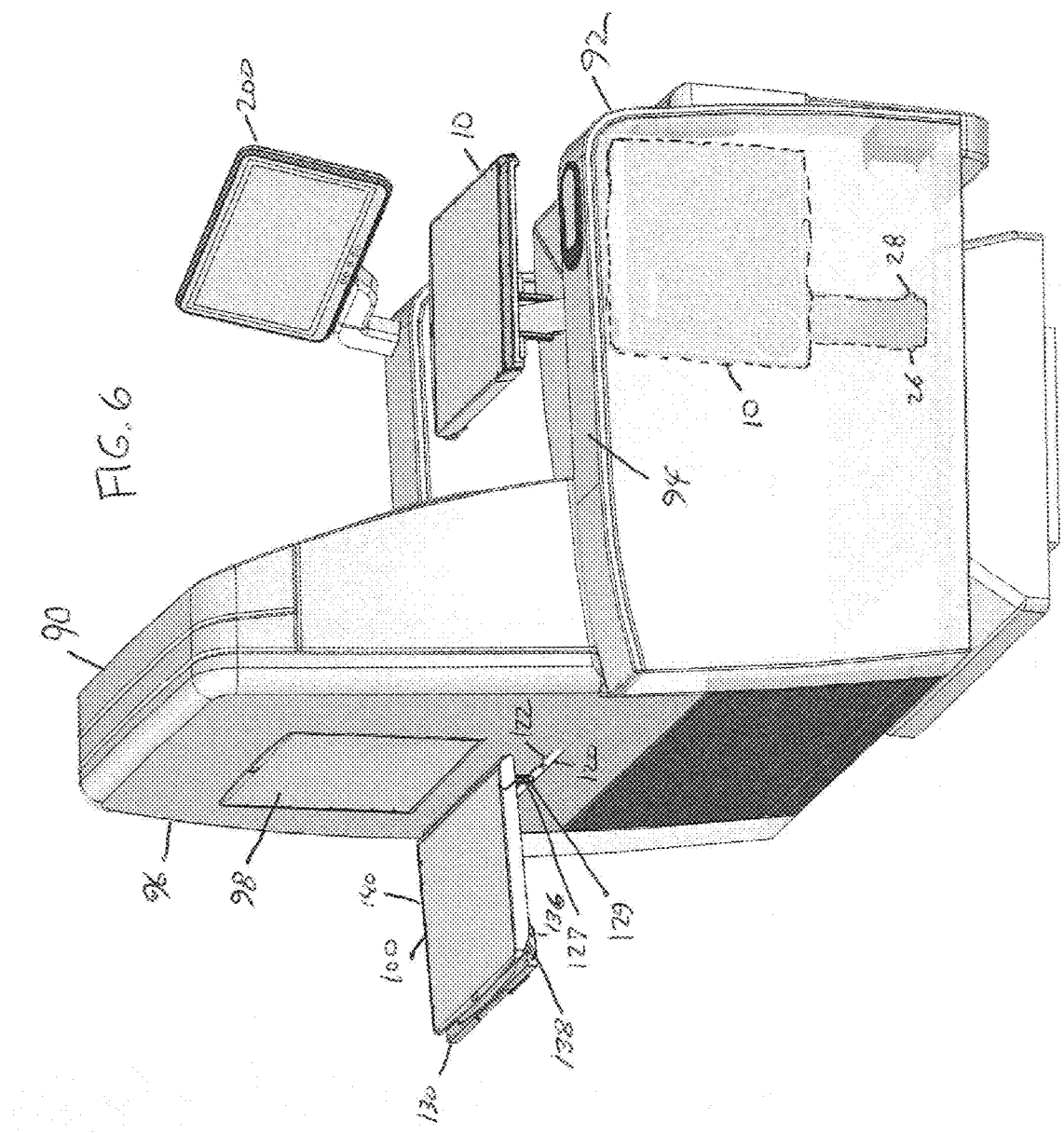

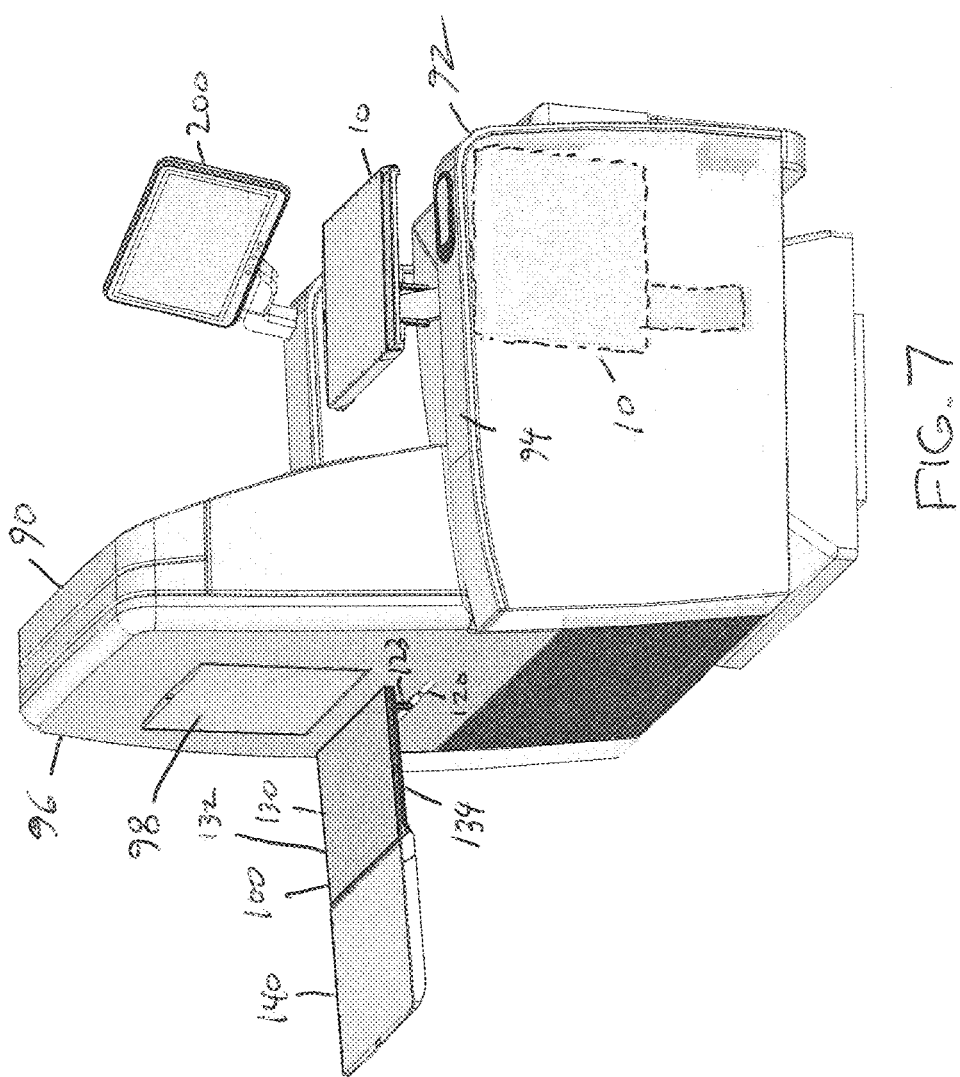

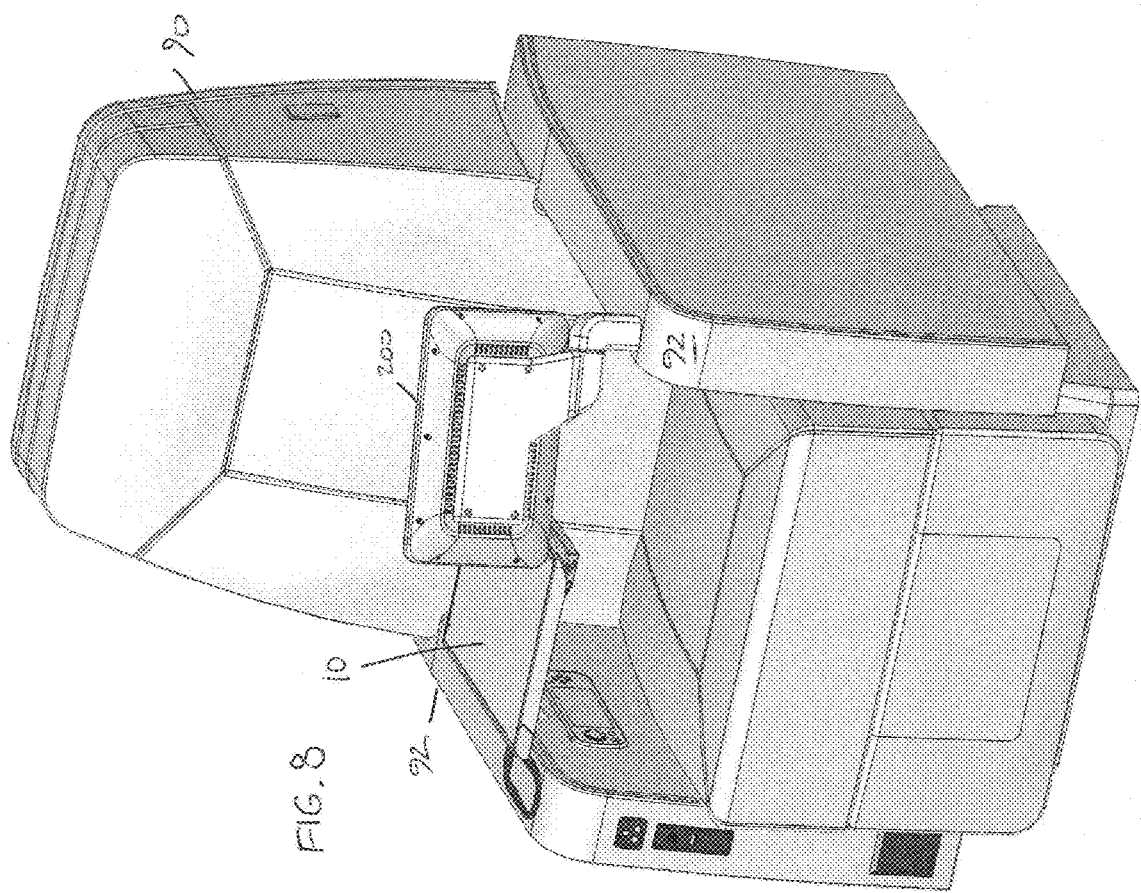

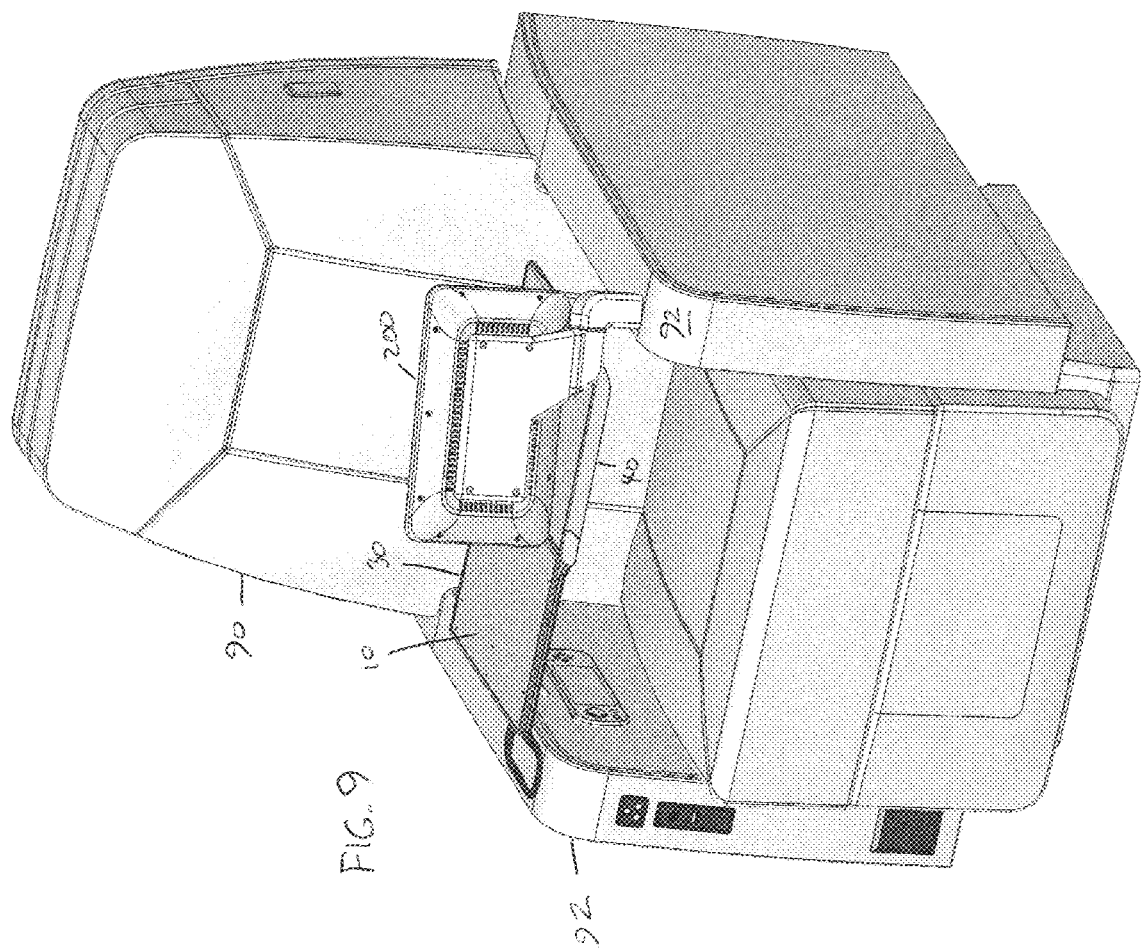

DEPLOYABLE TABLE ASSEMBLY

BACKGROUND

The present invention relates generally to tables. More particularly, the present invention relates to a deployable table associated with an aircraft passenger seat.

RELATED ART

It is common for passengers on both private and commercial aircraft to have use of tables built into the seatback of a passenger seat directly in front of them or tables deployable from within a seat console to one side of the passenger where the table surface must be unfolded to provide sufficient surface area for placement of food, drink or other objects thereupon. Today, it is also common for both private and commercial passenger aircraft to have an in-flight entertainment (IFE) system. An IFE system generally comprises an entertainment content source, such as a computer server having entertainment and/or information media (e.g., movies, music, television shows and/or other entertainment media content) stored in digital format; a wired or wireless networking system as required to send the entertainment media throughout the aircraft; and at least one video display monitor to present the entertainment media to at least one passenger in his or her seat. Each passenger may have his or her own personal video display monitor associated with his or her seat to provide that passenger with entertainment and/or information. Each seat may include or be associated with a video arm (i.e., a mechanical deployment arm) used to deploy, position and/or support the particular video display monitor associated with that seat so that the entertainment and/or information displayed on the video display monitor can be more easily viewed by the passenger associated with that seat. The video arm allows the video display monitor, when not in use, to be stowed securely under a seat, between seats or inside a seat console associated with one or more seats. The video arm may also allow the video display monitor to be deployed from a stowed position and positioned in front of the specific passenger associated with that video display monitor in a deployed position. However, problems arise when a passenger desires to use both the table and the video display monitor at the same time. Because of space limitations on aircraft, as well as other ergonomic issues, passenger have only a relatively small area for personal use when they are seated, resulting in the table and the video monitor being positioned in relatively close proximity to each other when in use. Due to these space limitations, if a passenger is not paying attention, the screen of the video display monitor can be damaged during deployment/stowage of either the table or the video display monitor if any part of the table contacts the video display monitor, especially the screen of the video display monitor. Damaged video display monitors are expensive to replace, costing airlines in both labor and equipment. A video display monitor can cost several thousand US dollars to replace. A modern commercial passenger aircraft can carry several hundred passengers. If even only one video display monitor is damaged during each flight of that aircraft, the cost of replacing video display monitors in that aircraft over time can run into the hundreds of thousands of US dollars.

Different types of tables associated with aircraft passenger seats have been proposed that can be moved between stowed and deployed positions. However, such tables have their limitations and can always be improved.

Accordingly, there is a need for a table movable between stowed and deployed positions that virtually eliminates the potential for damaging a video display monitor, especially the screen of the video display monitor, during deployment/stowage of either the table or the video display monitor. There is an additional need for a table that is easier to stow and deploy. There is also a need for a table that can be used to retrofit/replace tables that can damage video display monitors. The present invention satisfies these needs and provides other related advantages.

SUMMARY OF THE INVENTION

The table assembly illustrated herein provides a table movable between stowed and deployed positions that virtually eliminates the chance that a video display monitor will be damaged as the table is moved between the stowed and deployed positions. The table assembly illustrated herein is easier to stow and deploy. The table assembly illustrated herein can be used to retrofit/replace tables that can damage video display monitors.

In an embodiment, a table assembly comprises a lower table portion, and an upper table portion operationally engaging the lower table portion. The upper and lower table portions are slidably movable relative to each other between a generally parallel configuration wherein the lower and upper table portions are vertically stacked and a generally co-planar configuration wherein the lower and upper table portions are generally horizontally aligned.

In another embodiment, the lower table portion includes at least one channel, and the upper table portion engages the at least one channel such that the upper table portion is moveable between a position generally parallel to and above the lower table portion and a position generally co-planar with the lower table portion.

In an additional embodiment, the at least one channel includes a primary portion and a secondary portion.

In a further embodiment, channel depth of the primary portion is greater than channel depth of the secondary portion.

In yet another embodiment, the upper table portion includes a first pin, and a second pin; and wherein the primary portion engages both first and second pins, and the secondary portions engages only the second pin.

In yet a further embodiment, the first pin is longer than the second pin.

In an embodiment, the upper table portion includes at least one pin engaging the at least one channel of the lower table portion.

In another embodiment, the at least one pin travels along the channel as the upper table portion moves laterally relative to the lower table portion.

In an additional embodiment, the table assembly further comprises a base portion rotationally engaging a surface. The lower table portion operationally engages the base portion such that the lower table portion is rotatable relative to the base portion.

In a further embodiment, the base portion comprises a mount portion, and an attachment portion. The lower table portion operationally engages the mount portion, and the attachment portion engages the surface.

In yet another embodiment, the mount and attachment portions are pivotally connected.

In yet a further embodiment, a linkage operationally connects, limits rotation of the lower table portion relative to the base portion.

In an embodiment, the upper and lower table portions are in a generally vertical orientation in a stowed position, and in a generally horizontal orientation in a deployed position.

In another embodiment, upper surfaces of the lower and upper table portions form a generally continuous table surface when the lower and upper table portions are generally horizontally aligned.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The various present embodiments now will be discussed in detail with an emphasis on highlighting the advantageous features with reference to the drawings of various embodiments. The illustrated embodiments are intended to illustrate, but not to limit the invention. These drawings include the following figures, in which like numerals indicate like parts:

FIG. 5 is an enlarged view of a section of the side view of FIG. 2; and

FIG. 6 is a view showing a table assembly illustrating an embodiment of the present invention at least partially deployed from a sidearm of a seat, and a table assembly illustrating an embodiment of the present invention at least partially deployed from a seatback of the seat;

FIG. 7 is similar to FIG. 6, except that the table assembly deployed from the seatback is in a fully deployed position;

FIG. 8 is a view showing a table assembly illustrating an embodiment of the present invention at least partially deployed from a sidearm of a seat in relation to a deployed video monitor; and FIG. 9 is similar to FIG. 6, except that the table assembly deployed from the sidearm of the seat is in a fully deployed position.

DETAILED DESCRIPTION

Figure 1:
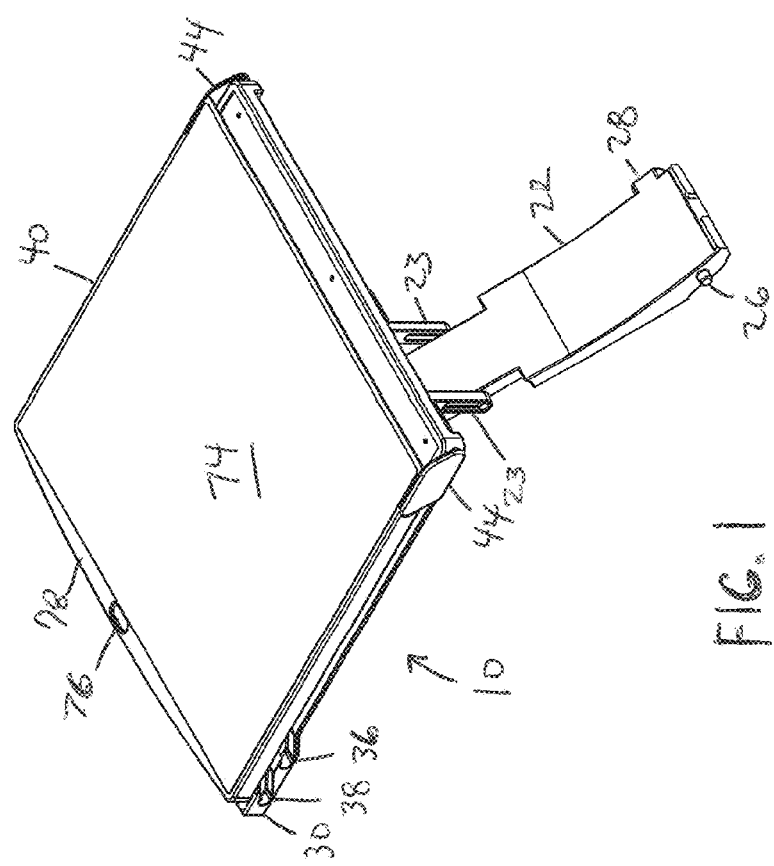
FIG. 1 is a perspective view of a table assembly illustrating an embodiment of the present invention in a partially deployed position with an upper table assembly in a stowed position relative to a lower table assembly.
Figure 2:
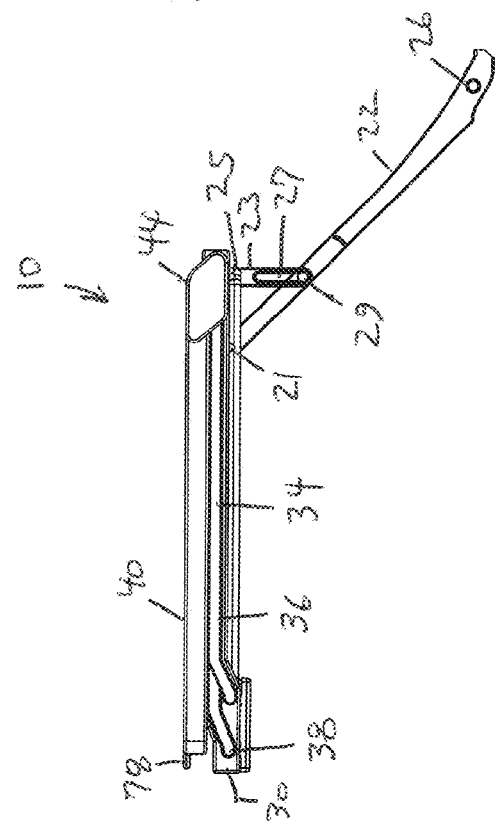
FIG. 2 is a side view of the table assembly of FIG. 1.

The following detailed description describes the present embodiments with reference to the drawings. In the drawings, reference numbers label elements of the present embodiments. These reference numbers are reproduced below in connection with the discussion of the corresponding drawing features.

As shown in FIGS. 1-5 for purposes of illustration, an embodiment of the present invention resides in a table assembly 10 movable between stowed and deployed positions. The assembly 10 includes a base assembly 20, a lower table assembly 30 and an upper table assembly 40.

The base or paddle assembly 20 includes an attachment portion 22 and a mount portion 24 pivotally engaged to the attachment portion 22 by a pair of pivot pins 21. The attachment portion 22 operationally engages a seat console (not shown) to one side of a passenger or, alternatively, the seatback (not shown) of a passenger seat in front of the passenger. A pivot cylinder 26 on the attachment portion 22 operationally engages the seat console (or, alternatively, the seatback) and provides a pivot axis about which the attachment portion 22 can pivot relative to the seat console or seatback. A cam 28 on an opposite side of the attachment portion 22 (generally opposite from the pivot cylinder 26) operationally engages the seat console (or, alternatively, the seatback) and limits pivotal rotation of the attachment portion 22 relative to the seat console (or, alternatively, the seatback) to approximately thirty five to forty five degrees of rotation, preferably forty degrees of rotation. The mount portion 24 is further pivotally connected to the attachment portion 22 by mechanical links 23. Each link 23 is pivotally connected to both the mount portion 24 and the attachment portion 22. The mount portion 24 includes a pair of pins 25. Each pin 25 engages an end of a respective link 23. Each link 23 includes a slot 27 which engages a respective pin 29 on the attachment portion 22. Each pin 29 moves along the slot 27 as the table assembly 10 is moved between stowed and deployed positions. The links 23 are designed so that when the table assembly 10 is deployed, as seen in FIGS. 1-4, the lower and upper table assemblies 30, 40 will be oriented in a generally horizontal position while the links 23 will be oriented in a generally vertical position. The length of the slot 27 limits pivotal rotation of the mount portion 24 relative to the attachment portion 22 about the pivot pins 21 to approximately twenty five to thirty five degrees of rotation, preferably thirty degrees of rotation.

The lower table assembly 30 includes a table portion 32 having an upper side with a table surface. A lower side of the table portion 32 engages an upper side of the mount portion 24 and is connected thereto by mechanical and/or chemical fasteners. The table portion 32 includes a pair of tracks or channels 34 with each channel 34 on an opposite side of the table portion 32 from the other. Each channel 34 has a primary track or channel 36 and a secondary track or channel 38. The primary channel 36 is recessed into the table portion 32 to a greater depth than the secondary channel 38. The upper table assembly 40 operationally engages the channels 34 such that the upper table assembly 40 is slidably movable relative to the lower table assembly 30. The upper table assembly 40 portions moves from a stowed or "stacked" position generally above and parallel to the lower table assembly 30 to a deployed position generally adjacent, aligned and co-planar with the lower table assembly 30 as the upper table assembly 40 is laterally slid away from the lower table assembly 30. The deployed lower and upper table assemblies 30, 40 provide a table surface area for placement of food, drink or other objects thereupon. Even in its stowed or "stacked" position, the upper table assembly 40 provides a table surface area for placement of food, drink or other objects thereupon.

The upper table assembly 40 includes a table portion 42 having an upper side with a table surface. A pair of pin flanges 44 operationally engage the lower and upper table assemblies 30, 40. Each pin flange 44 engages the lower and upper table assemblies 30, 40 on an opposite side of the lower and upper table assemblies 30, 40 from the other pin flange 44. Each pin flange 44 includes at least two pins 46, 48 that engage one of the channels 34 of the lower table assembly 30. The pins 46, 48 are horizontally spaced apart and aligned relative to each. Each pin 46, 48 has a respective roller 50, 52 placed around that pin 46, 48. Each pin flange 44 also includes an engagement flange 54 extending away from the main body of the pin flange 44. Each engagement flange 54 is insertable into a respective recess 56 on opposite sides of the upper table portion 40. Each engagement flange 54 includes an aperture 58 through which a fastener 59 may be passed to connect the pin flange 44 to the upper table assembly 40. The upper table assembly 40 includes bores (not shown) formed above and below each of the recesses 56 so that the fasteners 59 may passed from a bottom side of the table portion 42 below the recesses 56 to pass through the aperture 58 to connect the pin flanges 44 to the upper table assembly 40 (the bores not extending through to the top surface of the table portion 42). In the alternative, the pin flanges 44 may be made of single piece construction with the upper table assembly 40. Once the table assembly 10 is fully deployed, the table surfaces of the lower and upper table assemblies 30, 40 provide a generally flat, generally continuous table surface upon which food, drink or other objects may be placed by a passenger. The continuity of the table surface is broken along a border 73 between the directly adjacent edges of the lower and upper table assemblies 30, 40 when the assemblies 30, 40 are horizontally co-planar. However, the top surfaces of the assemblies 30, 40 are such that the edges of the assemblies 30, 40 meet in a manner that the border 73 between the assemblies 30, 40 forms a de minimis discontinuity in the overall table surface formed by the top surfaces of the assemblies 30, 40.

As stated above, each channel 34 has a primary channel 36 and a secondary channel 38 with the primary channel 36 recessed into the table portion 32 to a greater depth than the secondary channel 38. Pin 46 is longer than pin 48 (i.e., pin 46 is the "tall" pin while pin 48 is the "short" pin on the pin flange 44). Likewise, roller 50 is longer than roller 52. As the primary channel 36 is recessed into the table portion 32 to a greater depth than the secondary channel 38, the primary channel 36 is able to receive and engage both rollers 50, 52 but only the secondary channel 38 is able to receive and engage the roller 52 (i.e., the "short" roller) as the depth of the secondary channel 38 is insufficient to accommodate the roller 50 (i.e., the "tall" roller). The secondary channel 38 forks from the primary channel 36 in such a manner that as the upper table assembly 40 is laterally slid away from the lower table assembly 30, the upper table assembly 40 is moved away from a stowed or "stacked" position generally above and parallel to the lower table assembly 30. As the roller 52 enters the secondary channel 38, the pins 46, 48 are spaced apart such that the roller 50 remains in the primary channel 36 and continues to do so until the roller 52 reach the end of the secondary channel 38 concurrently with the roller 50 reaching the end of the primary channel 36. When the rollers 50, 52 reach the end of their respective channels 36, 38, the upper table assembly 40 is in a fully deployed position generally adjacent, generally aligned and generally co-planar with the lower table assembly 30. The ends of the channels 36, 38 are designed to aid in locking in the angle of the lower and upper table assemblies 30, 40 relative to each other such that the table surfaces of the lower and upper table assemblies 30, 40 provide a generally flat, generally continuous table surface upon which food, drink or other objects may be placed by a passenger when the table assembly 10 is fully deployed. When the rollers 50, 52 reach the end of the slope there is a small flat area X a few hundredths of an inch in length (e.g., ~0.02-0.05 inches) that the rollers 50, 52 travel in a horizontal fashion. When the rollers 50, 52 reach the ends of the primary and secondary channels 36, 38, there is a slight difference in relative height Y between any point on the roller 50 in primary channel 36 and the corresponding point on the roller 52 in the secondary channel 38 (e.g., relative height difference Y exists between the central pivot axis of the roller 50 and the central pivot axis of the roller 52). This height difference Y is about one to two hundredths of an inch (e.g., ~0.01-0.02 inches) and gives the table surface a slight lift so that when food, drink, books, magazines, electronic devices or other objects are placed on the table surface, the table surface will stay near horizontal and not slope down. The rollers 50, 52 engaging the small flat area X of their respective channels 36, 38, in addition to the rollers 50, 52 moving to the ends of their respective channels 36, 38 with the height difference Y, gives the feel of a detent or snap at the end of the table deployment. The height difference Y exists because the bottom of the end of the primary channel 36 is closer to the bottom edge of table portion 32 than the bottom of the end of the secondary channel 38.

A lip 60 extending downward along the lower side of the upper table portion 42 extends over the channel sides of the lower table portion 32 such that the lip 60 acts as a guide, aiding in lateral movement of the upper table portion 42 relative to the lower table portion 32. A pair of bumpers 62 are operationally connected to the lower side of the upper table portion 42 to prevent metal to metal contact between the lower and upper table portions 32, 42 when the lower and upper table portions 32, 42 are made from metal (e.g., aluminum). The bumpers 62 are connected to the upper table portion 42 by fasteners 64 inserted through respective bore holes 66 in the bumpers 62. The fasteners 64 engage the lower side of the upper table portion 42 and hold the bumpers 62 in place.

Each table portions 32, 42 include a recess 68, 70 on a top surface thereof into which inserts 72, 74 may be placed. The inserts 72, 74 provide a generally flat, continuous friction surface upon which food and beverage containers or other objects may be placed, the friction provided by the surface of the insert 72, 74 reduces movement of the containers or other objects placed on the table surface. Alternatively, the top surfaces of each of the table portions 32, 42 may be formed without recesses and provide a surface with sufficient friction to reduce movement of the containers or other objects placed on the table surface. In either case, the table surface may include a relatively shallow cylindrical recess for placement of the base of a beverage container (e.g., a cup, a soda can or the like) therein.

The upper table assembly 40 includes a detent 76 on a lip 78 on the table portion 42. The detent 76 and lip 78 aid a passenger's fingers in obtaining a firm grasp on the table portion 42 as the passenger manually slides the upper table assembly 40 away from the lower table assembly 30. The lower table assembly 30 includes recesses 80, 82 on the table portion 32 to aid a passenger's fingers in obtaining a firm grasp on the table portion 32 as the passenger manually pulls the table assembly 10 from its stowed position.

Figure 3:
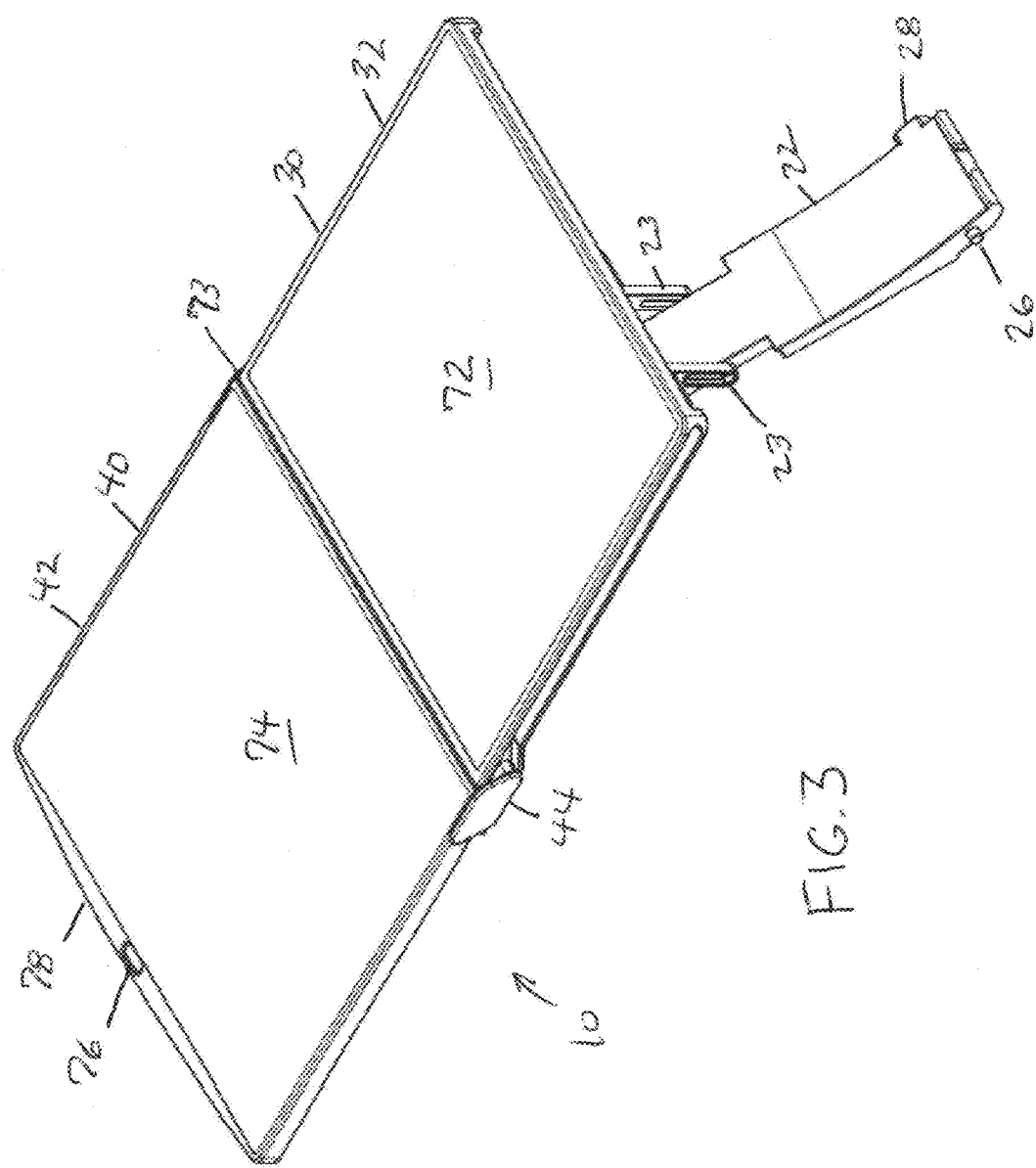
FIG. 3 is a perspective view of the table assembly of FIG. 1 with the upper table assembly in a fully deployed position relative to the lower table assembly.
Figure 4:
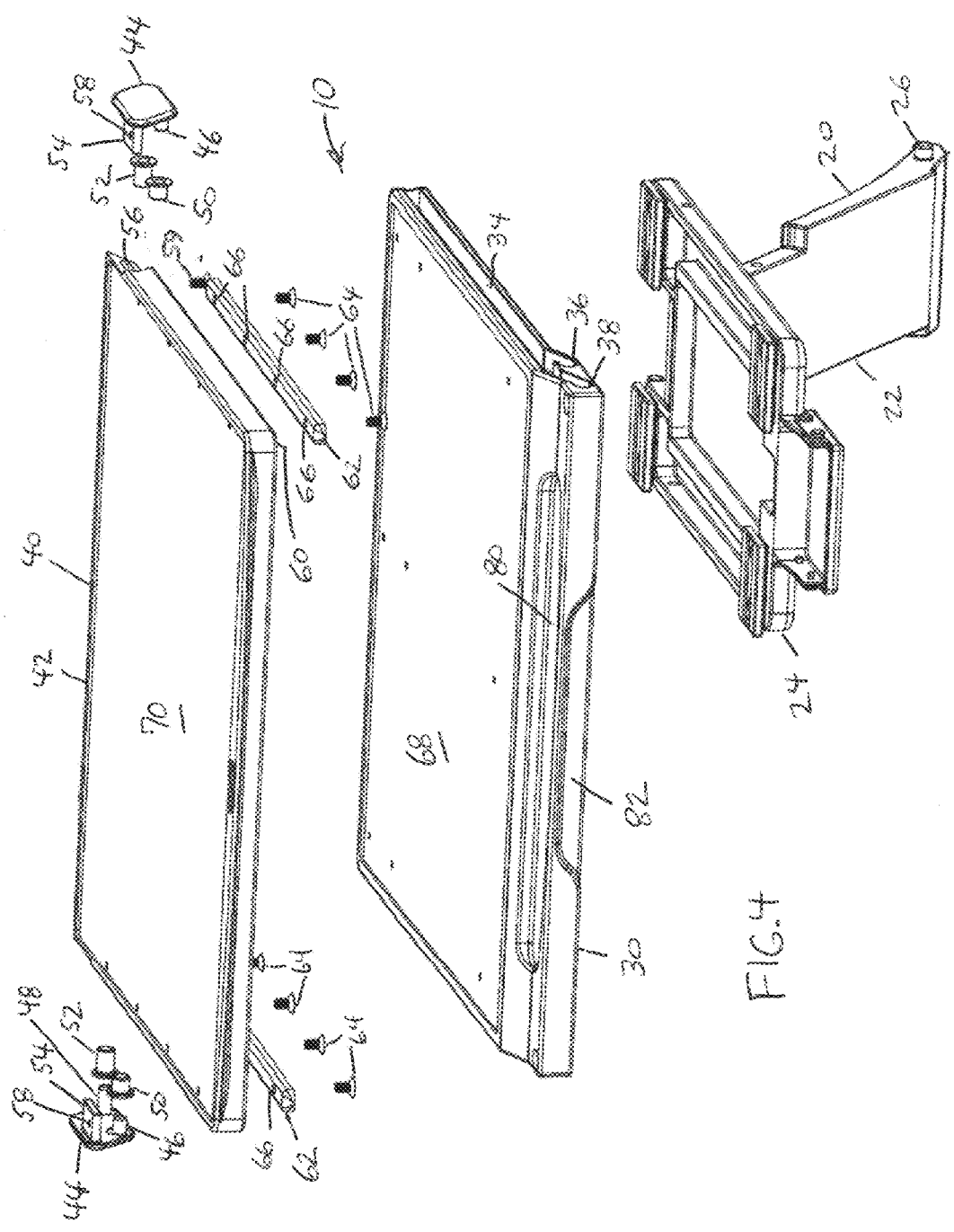
FIG. 4 is an exploded perspective view of the table assembly of FIG. 1 from a different angle than that shown in FIG. 1.

In an embodiment of the present invention, the table assembly 10 is disposed within an interior of a seat console or housing. In use, the deployment stages required to bring the table 10 to its fully deployed position are as follows: stowed position (table assembly 10 illustrated in phantom in FIGS. 6 and 7), initial deployment (FIGS. 1, 2, and 6-8), and secondary deployment (FIGS. 3 and 9). A table assembly 10 is illustrated (in phantom lines) in a stowed position within a recess or inner cavity of a seat sidearm 92 (FIGS. 6 and 7) of a passenger seat 90. A cover 94 on the top of the seat sidearm can be rotationally opened to provide access to the recess or inner cavity to deploy the table assembly 10 and closed when the table assembly 10 is in the stowed position within the inner cavity. The attachment portion 22 of the table assembly 10 operationally engages rails or tracks (not shown) within the recess or inner cavity of the seat sidearm. In the initial deployment stage, the table assembly 10 is manually lifted (i.e., manually deployed) by a user (e.g., passenger) in a vertical orientation from within the recess in which the table assembly 10 is stowed (i.e., manually lifted in the same orientation in which the table assembly 10 is stowed) such that the table assembly 10 is in the same orientation when fully extended upwards along the tracks from the stowed position (with the upper 40 and lower 30 table assemblies still in a stacked configuration). The pivot cylinder 26 and cam 28 on the attachment portion 22 operationally engage the tracks, providing a pivot axis about which the attachment portion 22 can pivot relative to the seat 90 with the cam 28 limiting pivotal rotation relative to the seat 90. The tracks can be designed to frictionally engage the attachment portion 22 to prevent the table assembly 10 from slamming downwards into the recess or inner cavity of the seat sidearm 92 if the user accidentally lets go of the table assembly 10 during upward deployment of the table assembly 10 from the seat sidearm 92. The user then rotates the table assembly 10 about a horizontal axis extending through the pivot 26 until the stacked lower and upper table assemblies 30, 40 are in a horizontal position (as seen in FIGS. 1, 2, and 6-8). In secondary deployment, the passenger pulls the upper table assembly 40 laterally away from the lower table assembly 30 in a horizontal direction (i.e., towards the left sidearm 92 if the table assembly 10 is deployed from the right sidearm 92 of the seat 90 as seen from the perspective of a seated user), with the rollers 50, 52 of the upper table assembly 40 sliding along the channel 34 in the lower table assembly 30 until the rollers 50, 52 reach the end of the channel 34 (as seen in FIGS. 3 and 9). The sidearm 92 may include a small aperture (not shown) which allows the attachment portion 22 to rotate downward into a position where the cover 94 over the recess can be closed when the table portions 30, 40 are in a deployed position.

In the alternative, the table assembly 10 can be automatically deployed vertically upward from within the recess of the sidearm 92, and then manually further deployed by the user. In this alternative, an end of a laminated, rolled, constant force spring operationally engages a sidewall of the recess within the sidearm 92 while another end of the spring operationally engages the attachment portion 22. The attachment portion 22 includes a semi-cylindrical recess for receiving a spring drum assembly connected to the spring. The spring drum assembly includes a cylinder, and an axle. The spring drum assembly is connected to the attachment portion 22. When the axle is fastened in position, the spring drum is connected to the attachment portion 22 and the cylinder is rotatable about the axle. The spring may come in various forms including, but not limited to, two thin constant force springs placed one on top of the other and then coiled up together. As above, the attachment portion 22 of the table assembly 10 operationally engages rails or tracks (not shown) within the recess such that the attachment portion 22 engages and moves back and forth vertically along the tracks. The attachment portion 22 includes a brake engaging the tracks, using friction to slow the attachment portion 22 as the spring pulls the attachment portion 22 vertically along the tracks. Upon vertical deployment, the table assembly 10 can be moved to a fully deployed position in the manner described above. Vertical deployment of the table assembly 10 from the stowed position within the recess is achieved by attaching an internal diameter of one end of the constant force spring to the cylinder of the spring drum. The spring and the spring drum cooperate to provide the constant linear force that moves the table assembly 10 along the tracks as the spring, attached on one end to the spring drum, rolls about the cylinder of the spring drum and pulls the table assembly 10 vertically upwards out of the recess. Application of the constant linear force provided by the spring to the table assembly 10 pulls the table assembly 10 from one end of the track to the other end. The brake controls the speed of the table assembly 10 along the track as the table assembly 10 travels between the ends of the tracks. The speed of the deployment is controlled by the brake frictionally contacting at least one of the tracks, which partially counters the pull of the spring and slows the rise of the table assembly 10 along the tracks. The seat 90 includes a mechanism for preventing vertical travel of the table assembly 10. The mechanism may come in various forms including, without limitation, a latch assembly or the like. The latch assembly includes a stationary, spring-loaded latch mounted on a pivot axle. The pivot axle extends outwardly from a base mounted to a surface. In the stowed position, the latch engages the table assembly 10. The engagement of the latch and table assembly 10 prevents the table assembly 10 from being pulled vertically upwards by the spring. The latch can be selectively disengaged by a mechanism, allowing the table assembly 10 to travel vertically upwards along the tracks. The mechanism includes a button operatively connected to the latch by a mechanical linkage. Pressing the button moves the linkage which, in turn, pivots the latch away from the table assembly 10, disengaging the latch from the table assembly 10 and freeing the table assembly 10 to travel along the tracks. When the latch is released, the spring coils upon itself around the spring drum and causes the table assembly 10 to rise upwardly along the tracks from one end of the tracks to the other. In the alternative, the mechanism may disengage the latch and table assembly 10 by a passenger pushing downwardly on the table assembly 10 operatively connected to the latch (via the linkage) which, in turn, pivots the latch away from the table assembly 10, disengaging the latch from the table assembly 10. Once the spring-loaded latch is disengaged from the table assembly 10 and the table assembly 10 moves away from the stowed position, the latch will automatically pivot back to the position the latch was in when the latch engaged the table assembly 10. However, the latch will not engage the table assembly 10 as the table assembly 10 has moved away from the stowed position.

In another embodiment, a table assembly 100 similar in structure/function to the table assembly 10 is adapted to deploy from a seatback 96 of the passenger seat 90. The table assembly 100 includes a base assembly 120, a lower table assembly 130 and the upper table assembly 140. In a stowed position, the table assembly 100 is at least partially stowed within a recess 98 of the seatback 96. The recess 98 of the seatback 96 is sized and shaped to receive at least a portion of the upper table assembly 140 of the table assembly 100. Alternatively, the recess 98 is sized and shaped to receive both the upper 140 and lower 130 table assemblies in a stacked configuration. The lower and upper table assemblies 130, 140 are same as/similar to in structure/function as the lower and upper table assemblies 30, 40. The base assembly 120 is same as/similar to in structure/function as the base assembly 20, except that the base assembly 120 is adapted to deploy from the seatback 96. The base assembly 120 includes an attachment portion 122 and a mount portion (not shown) pivotally engaged to the attachment portion 122 by a pair of pivot pins (not shown). The attachment portion 122 operationally engages the seatback 96. A pivot cylinder (not shown) on the attachment portion 122 operationally engages the seatback 96 and provides a pivot axis about which the attachment portion 122 can pivot relative to the seatback 96. A cam (not shown) on an opposite side of the attachment portion 122 (generally opposite from the pivot cylinder) operationally engages the seatback 96 and limits pivotal rotation of the attachment portion 122 relative to the seatback 96 to approximately forty degrees of rotation. The mount portion is further pivotally connected to the attachment portion 122 by mechanical links 123. Each link 123 is pivotally connected to both the mount portion and the attachment portion 122. The mount portion includes a pair of pins (not shown) where each pin engages an end of a respective link 123. Each link 123 includes a slot 127 which engages a respective pin 129 on the attachment portion 122. Each pin 129 moves along the slot 127 as the table assembly 100 is moved between stowed and deployed positions. The links 123 are designed so that when the table assembly 100 is deployed, as seen in FIG. 7, the lower and upper table assemblies 130, 140 will be oriented in a generally horizontal position while the links 123 will be oriented in a generally vertical position. The length of the slot 127 limits pivotal rotation of the mount portion relative to the attachment portion 122 about pivot pins (not shown) to approximately thirty degrees of rotation. The lower table assembly 130 includes a table portion 132 having an upper side with a table surface. A lower side of the table portion 132 engages an upper side of the mount portion and is connected thereto by mechanical and/or chemical fasteners. The table portion 132 includes a pair of tracks or channels 134 with each channel 134 on an opposite side of the table portion 132 from the other. Each channel 134 has a primary track or channel 136 and a secondary track or channel 138. The primary channel 136 is recessed into the table portion 132 to a greater depth than the secondary channel 138. The upper table assembly 140 operationally engages the channels 134 such that the upper table assembly 140 is slidably movable relative to the lower table assembly 130. The upper table assembly 140 portions moves from a stowed or "stacked" position generally above and parallel to the lower table assembly 130 to a deployed position generally adjacent, aligned and co-planar with the lower table assembly 130 as the upper table assembly 140 is laterally slid away from the lower table assembly 130. The deployed lower and upper table assemblies 130, 140 provide a table surface area for placement of food, drink or other objects thereupon. Even in its stowed or "stacked" position, the upper table assembly 140 provides a table surface area for placement of food, drink or other objects thereupon.

Alternative, the base assembly 100 could be eliminated in favor of a pivot at the end of the lower table assembly 130 closest to the seatback to rotate the table assembly 100 down from the stowed position and then slidingly deployed towards the passenger such that once the table assembly 100 is fully deployed, the table surfaces of the lower and upper table assemblies 130, 140 provide a generally flat, generally continuous table surface upon which food, drink or other objects may be placed by a passenger.

In another alternative, the table assembly 10, 100 is contained in a space between passenger chairs, or in a space between a passenger chair and a bulkhead, and so on. The table assembly 10, 100 is vertically rotated out from the space in which it is stowed (i.e., rotated about a horizontal axis). In any event, the table assembly 10, 100 is stowed out of sight of the passenger, and the table portions may be deployed in a manner similar to that described above.

As seen in FIGS. 6-9, the table assembly 10 provides a table movable between stowed and deployed positions that virtually eliminates the chance that a video display monitor 200 will be damaged as the table is moved between the stowed and deployed positions. The video monitor 200 is moveable between stowed and deployed positions. The video monitor is shown in a deployed configuration. The sliding deployment/stowage of the lower and upper table assemblies 30, 40 relative to each other prevents damage to an already deployed video monitor 200.

Although the present invention has been discussed above in connection with use on a passenger aircraft, the present invention is not limited to that environment and may also be used on passenger trains, cars, buses and other vehicles including, but not limited to, carts, carriages, and devices mounted on rails.

Likewise, the present invention is also not to be limited to use in vehicles and may be used in non-vehicle or stationary environments where it is desirable to stow and deploy a flat work surface for use in the types of activities that the flat surfaces of tables, desks, countertops or the like are typically used for.

In addition, the claimed invention is not limited in size and may be constructed in miniature versions or for use in very large-scale applications in which the same or similar principles of operation as described above would apply. Likewise, the length and width of the table surface areas provided by the lower 30, 130 and upper 40, 140 table assemblies are not to be construed as drawn to scale, and that the lengths/widths of the table surface areas may be adjusted in conformance with the area available for stowage/deployment of the table assemblies 10, 100. Furthermore, the figures (and various components shown therein) of the specification are not to be construed as drawn to scale.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

The use of the expression "at least" or "at least one" suggests the use of one or more elements or ingredients or quantities, as the use may be in the embodiment of the disclosure to achieve one or more of the desired objects or results.

The numerical values mentioned for the various physical parameters, dimensions or quantities are only approximations and it is envisaged that the values higher/lower than the numerical values assigned to the parameters, dimensions or quantities fall within the scope of the disclosure, unless there is a statement in the specification specific to the contrary.

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Spatially relative terms, such as "inner," "outer," "beneath", "below", "lower", "above", "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The above description presents the best mode contemplated for carrying out the present invention, and of the manner and process of making and using it, in such full, clear, concise, and exact terms as to enable any person skilled in the art to which it pertains to make and use this invention. This invention is, however, susceptible to modifications and alternate constructions from that discussed above that are fully equivalent. Consequently, this invention is not limited to the particular embodiments disclosed. On the contrary, this invention covers all modifications and alternate constructions coming within the spirit and scope of the invention as generally expressed by the following claims, which particularly point out and distinctly claim the subject matter of the invention.

What is claimed is:

1. A table assembly, comprising:
a lower table portion, and an upper table portion operationally engaging the lower table portion; wherein the lower table portion includes at least one channel recessed a depth into at least one side of the lower table portion; and
wherein the upper table portion engages the at least one channel such that the upper and lower table portions are slidably movable relative to each other between a generally parallel configuration wherein the lower and upper table portions are vertically stacked and a generally co-planar configuration wherein the lower and upper table portions are generally horizontally aligned.

2. The table assembly of claim 1, wherein the at least one channel includes a primary portion and a secondary portion.

3. The table assembly of claim 2, wherein channel depth of the primary portion is greater than channel depth of the secondary portion.

4. The table assembly of claim 2, wherein the upper table portion includes a first pin, and a second pin; and wherein the primary portion engages both first and second pins, and the secondary portions engages only the second pin.

5. The table assembly of claim 4, wherein the first pin is longer than the second pin.

6. The table assembly of claim 1, wherein the upper table portion includes at least one pin engaging the at least one channel of the lower table portion.

7. The table assembly of claim 6, wherein the at least one pin travels along the channel as the upper table portion moves laterally relative to the lower table portion.

8. The table assembly of claim 1, further comprising a base portion rotationally engaging a surface; wherein the lower table portion operationally engages the base portion such that the lower table portion is rotatable relative to the base portion.

9. The table assembly of claim 8, wherein the base portion comprises a mount portion, and an attachment portion; wherein the lower table portion operationally engages the mount portion, and wherein the attachment portion engages the surface.

10. The table assembly of claim 9, wherein the mount and attachment portions are pivotally connected.

11. The table assembly of claim 8, wherein a linkage operationally connects, and limits rotation of the lower table portion relative to the base portion.

12. The table assembly of claim 1, wherein the upper and lower table portions are in a generally vertical orientation in a stowed position, and in a generally horizontal orientation in a deployed position.

13. The table assembly of claim 1, wherein upper surfaces of the lower and upper table portions form a generally continuous table surface when the lower and upper table portions are generally horizontally aligned.

14. The table assembly of claim 1, wherein the upper and lower table portions maintain parallelism relative to each other as the upper table portion slidably moves along the channel between the generally parallel, vertically stacked configuration and the generally co-planar, generally horizontally aligned configuration.

15. A table assembly, comprising:
a lower table portion, and an upper table portion operationally engaging the lower table portion;
wherein the lower table portion includes at least one channel recessed a depth into at least one side of the lower table portion; and
wherein the upper table portion engages the at least one channel such that the upper table portion is moveable along the channel between a position generally parallel to and above the lower table portion and a position generally parallel, co-planar with the lower table portion, and whereby the upper and lower table portions maintain parallelism relative to each other as the upper table portion moves from the position above the lower table portion to the position co-planar with the lower table portion.

16. A table assembly, comprising:
a lower table portion; and
an upper table portion operationally engaging the lower table portion;
wherein the lower table portion includes a pair of channels, wherein each channel is recessed a depth into a side of the lower table portion on an opposite side of the lower table portion from the other channel; and the upper table portion includes a pair of flanges located on opposite sides of the upper table portion from one another, wherein each flange engages a particular one of the pair of channels; and wherein the upper table portion engages the channels such that the upper and lower table portions are slidably movable relative to each other between a generally parallel configuration wherein the lower and upper table portions are vertically stacked and a generally co-planar configuration wherein the lower and upper table portions are generally horizontally aligned.

17. The table assembly of claim 16, wherein each channel includes a primary portion having a depth, and a secondary portion having a depth; and wherein a first portion of each flange is capable of engaging both the primary and secondary portions of the particular channel that flange engages, and a second portion of each flange is capable of engaging only the primary portion of the particular channel that flange engages.

* * * * *